(12) United States Patent
Hirashima

(10) Patent No.: US 6,272,087 B1
(45) Date of Patent: Aug. 7, 2001

(54) OPTICAL DISC APPARATUS

(75) Inventor: Minoru Hirashima, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 0 days.

(21) Appl. No.: 09/174,777

(22) Filed: Oct. 19, 1998

(30) Foreign Application Priority Data

Oct. 30, 1997 (JP) .................................................. 9-298658

(51) Int. Cl.[7] .................................................. G11B 7/00
(52) U.S. Cl. ..................................... 369/53.22; 369/53.41
(58) Field of Search ................................. 369/47, 48, 49, 369/50, 54, 58, 59, 44.27, 44.28, 44.34, 44.35, 53.1, 53.11, 53.2, 53.22, 53.23, 53.38, 53.41, 47.1, 59.1, 59.14

(56) References Cited

U.S. PATENT DOCUMENTS

| | | | |
|---|---|---|---|
| 5,060,218 | * | 10/1991 | Chiyomatsu ............................ 369/47 |
| 5,684,771 | * | 11/1997 | Furukawa et al. ..................... 369/58 |
| 5,959,955 | * | 9/1999 | Choi ....................................... 369/58 |
| 6,061,318 | * | 5/2000 | Hwang ................................... 369/58 |

\* cited by examiner

*Primary Examiner*—Muhammad Edun
(74) *Attorney, Agent, or Firm*—Lackenbach Siegel Marzullo Aronson & Greenspan, P.C.

(57) ABSTRACT

An optical disc apparatus includes an optical pickup. When an optical disc is mounted, a focus search is carried out for a lens provided on the optical pickup, and the optical disc is discriminated as to its disc type. At this time, an AGC circuit of an RF amplifier is turned off. The reproduced signal from the RF amplifier is compared with a constant voltage. A measurement is made for a time for which an output from the comparator is at a high level. The high level time is compared with a reference time, thereby discriminating the type of the optical disc.

6 Claims, 3 Drawing Sheets

OPTICAL DISC APPARATUS

BACKGROUND OF THE INVENTION

1. Field of the Invention

This invention relates to optical disc apparatuses and, more particularly, to an optical disc apparatus which is adapted to discriminate the kind of a disc depending upon the level of a reproduced signal outputted, for example, from an RF amplifier.

2. Prior Art

In the conventional optical disc apparatuses of this kind, the reproduced signal is adjusted to a constant level by an AGC (Automatic Gain Control) circuit of an RF amplifier so that the signals recorded on the disc can be reproduced in accordance with a disc type.

In such prior art apparatuses, however, because the reproduced signal level is constantly adjusted by an AGC circuit, the normal disc (CD-ROM) and the rewritable disc (CD-RW) have respective RFDC signals generally at the same level. Accordingly, the discrimination on the disc type is impossible based on the reproduced signal outputted from the RF amplifier. This raises a problem that, if the disc type is incorrectly discriminated, the reproduced signal possibly exceeds a dynamic range of the AGC circuit as a result of a significant difference, between CD-ROM and CD-RW, in the reproduced signal level by the RF amplifier.

SUMMARY OF THE INVENTION

It is therefore a primary object of the present invention to provide an optical disc apparatus which is capable of correctly discriminating disc types.

An optical disc apparatus according to the present invention comprises: an RF amplifier which receives an RF signal outputted from an optical pickup and outputs a reproduced signal; a discriminating means which discriminates a type of a disc depending upon a level of the reproduced signal outputted from said RF amplifier; and an off means which turns an AGC circuit of said RF amplifier off when said discriminating means discriminates the type of said disc.

That is, the present invention is an optical disc apparatus characterized in that the RF amplifier AGC circuit is turned off when a type of a disc is discriminated depending on the level of a reproduced signal outputted from the RF amplifier.

Thus, when a disc is inserted into the optical disc apparatus, a focus search is carried out for the lens provided on the optical pickup. At this time, disc type discrimination is also started by the discriminating means and the off means first brings the RF amplifier AGC circuit to off. A laser beam irradiated by the optical pickup is reflected by the disc, and its reflection light is input to the RF amplifier. Disc type discrimination is made based depending upon a level of a reproduced signal outputted by the RF amplifier.

Incidentally, an adjusting means set a gain of the AGC circuit based on a result of this discrimination.

According to the present invention, the RF amplifier AGC circuit is turned off when a disc type is discriminated. Therefore, it is possible to correctly discriminate a disc type depending upon a level of a reproduced signal from the RF amplifier.

The above described objects and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
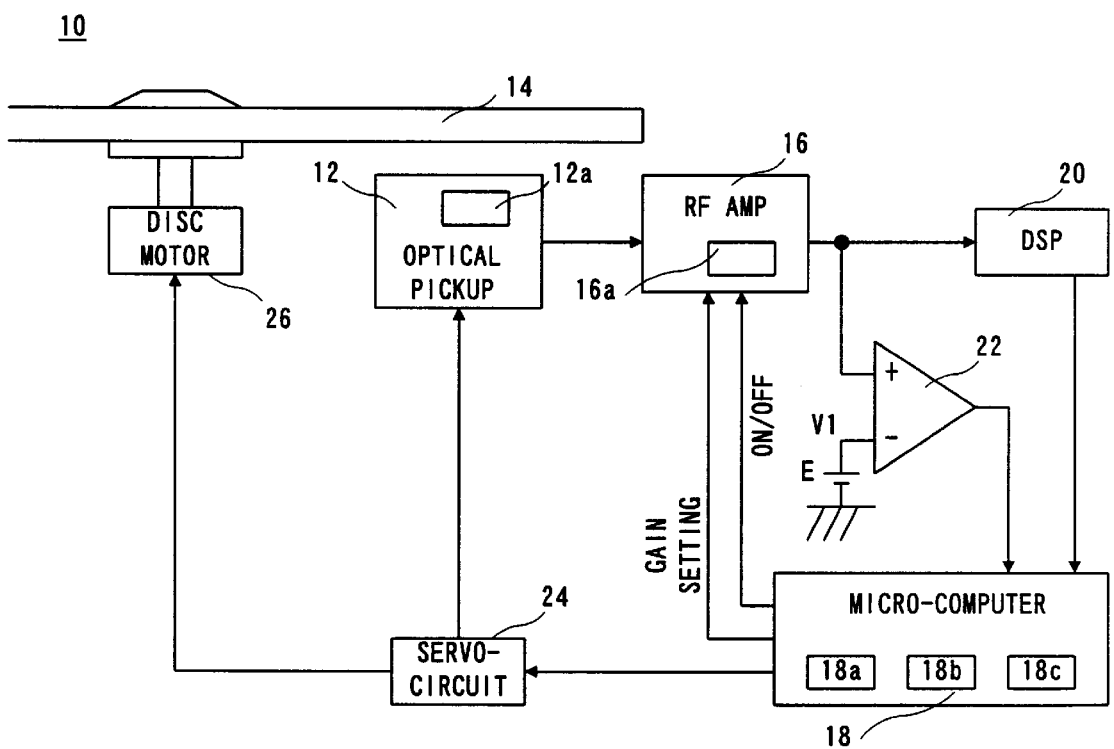
FIG. 1 is a block diagram showing one embodiment of the present invention.

Referring to FIG. 1, an optical disc apparatus 10 of this embodiment includes an optical pickup 12. The optical disc pickup 12 has a lens 12a through which tracks formed on an optical disc 14 are to be traced. Due to this, the signal recorded on the optical disc 14 is picked up so that a reproduced signal (electric signal) is created by an RF amplifier 16. The RF amplifier 16 includes an AGC circuit 16a so that the AGC circuit 16a adjusts the reproduced signal to maintain it at a constant level. The AGC circuit 16a turned or is switched on/off by an instruction from the micro-computer 18. That is, when the AGC circuit 16a is on, the reproduced signal from the RF amplifier 16 is adjusted to be maintained at a constant level. However, when the AGC circuit is turned off, the reproduced signal from the RF amplifier 16a may be a different level for each disc.

The reproduced signal outputted from the RF amplifier 16 is amplified by a DSP (Digital Signal Processor) 20. This amplified reproduced signal is subjected to processes, such as waveform shaping, demodulation, error correction, by a not-shown signal processing circuit. The micro-computer 18 controls, through a servo circuit 24, tracking and focussing servo functions for the optical pickup 12 as well as the rotation speed of the disc motor 26, based on the reproduced and tracking error signals supplied from the DSP 20.

The reproduced signal outputted from the RF amplifier 16 is supplied to a plus input terminal of a comparator 22, and compared with a constant voltage V1 given onto a minus input terminal of the comparator 22 from a constant voltage supply E. The comparator 22 supplies a high level or low level signal to the micro-computer 18. That is, when the output (RFDC signal) from the RF amplifier 16 is greater than the constant voltage V1, a signal indicative of a high level is delivered to the micro-computer 18, while, when the RFDC signal from the RF amplifier 16 is smaller than the constant voltage V1, a signal representative of a low level is supplied to the micro-computer 18.

Figure 2:
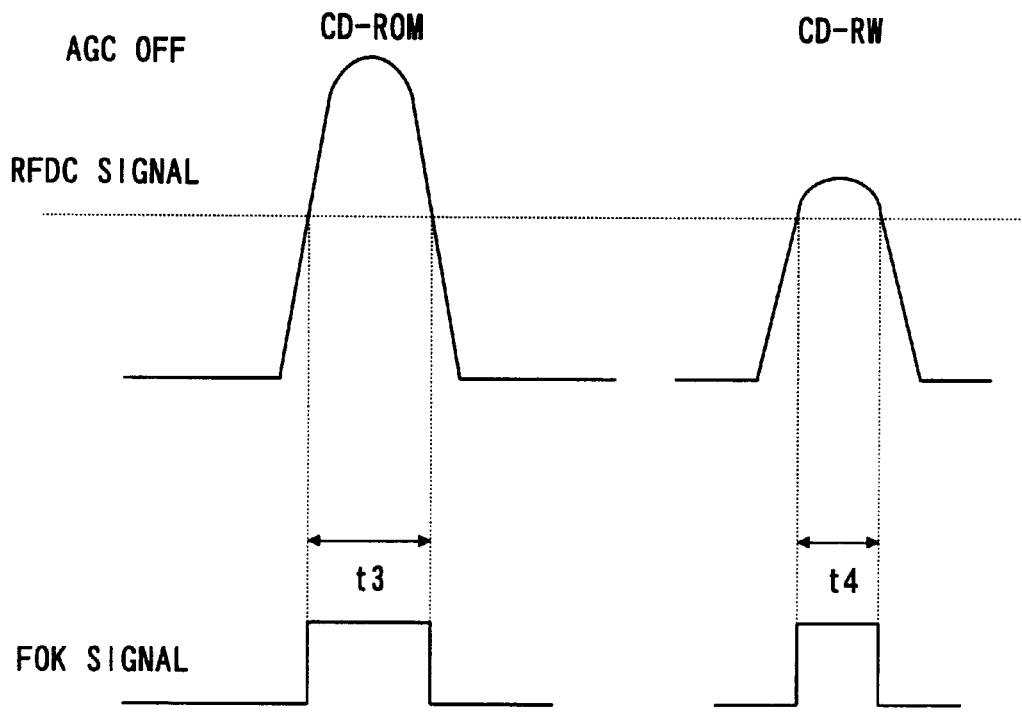
FIG. 2 is a graph showing an RFDC signal and FOK signal when an AGC circuit of the FIG. 1 embodiment is off.
Figure 4:
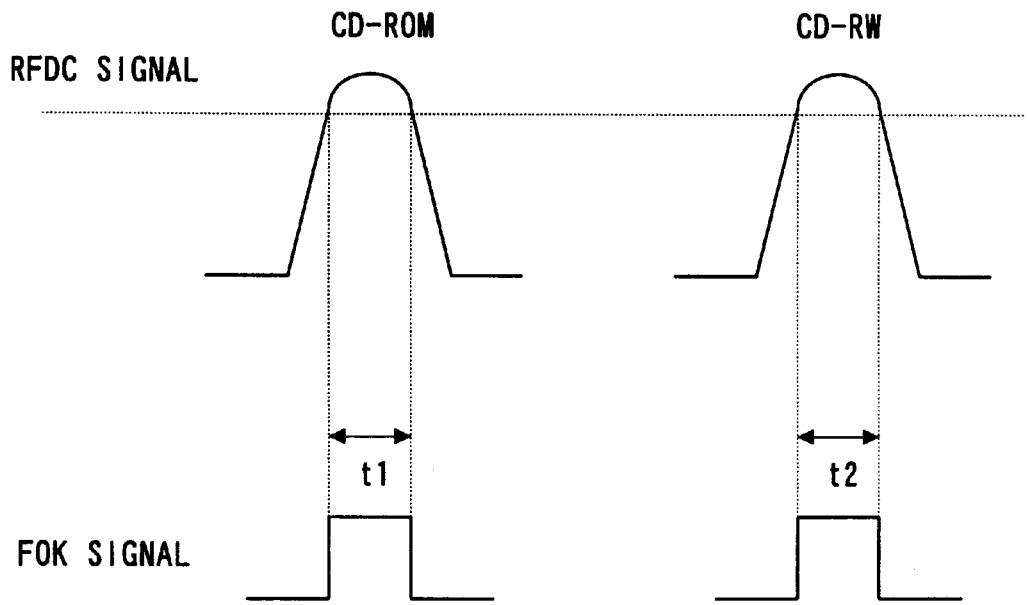
FIG. 4 is a graph showing an RFDC signal and FOK signal outputted from an RF amplifier where using a conventional optical disc apparatus.

For example, if an optical disc 14 is mounted on the optical disc apparatus 10, the optical disc 14 is discriminated as to the disc type. The micro-computer 18 turns off the AGC circuit 16a, and outputs a laser beam through the lens 12a and temporarily move the lens 12a downward (in an opposite direction to the optical disc 14). If the lens 12a reaches a lowest position of a not-shown actuator, then it is upwardly moved toward the optical disc. Focus search is carried out in this manner to detect an RFDC signal as shown in FIG. 2. As shown in FIG. 2, where the AGC circuit 16a is off, there is a significant level difference in the RFDC signal between CD-ROM and CD-RW, as compared with a conventional case shown in FIG. 4. There is also a difference, between CD-ROM and CD-RW, in high level time, i.e. T3 and T4, of an FOK signal that is obtainable by slicing the RFDC signal at a predetermined level. Accordingly, if previously measuring the length of a time t4 and determining a reference time $t_{Ref}$, it is possible to determine a disc type from the measured time t and the reference time $t_{Ref}$. That is, if the high level time period (measured time t) of the FOK signal is less than a predetermined time period (reference time $t_{Ref}$), the disc is determined as CD-RW. Incidentally, the reference time $t_{Ref}$ is memorized in a memory 18a provided in the micro-computer 18, and the measured time t which is counted (measured) by a timer 18b is a time period for which the signal outputted from the comparator 22 is at a high level. These values are compared by the micro-computer 18. Also, the slice level is determined by a constant voltage V1 given on the minus input terminal of the comparator 22. If the optical disc 14 type discrimination is completed, the micro-computer 18 turns on the AGC circuit 16a to set an AGC circuit 16a gain, for CD-ROM or CD-RW. In this embodiment, a count is started by a timer 18c provided in the micro-computer 18 simultaneously with the beginning of upward movement of the lens 12a. If the count value of the timer 18c exceeds 1.5 seconds, focus search is completely ended. Accordingly, where no RFDC signal is detected in this duration, it is determined that the RFDC signal level is smaller than the slice level (constant voltage V1 level), thus discriminating the disc type as CD-RW.

Figure 3:
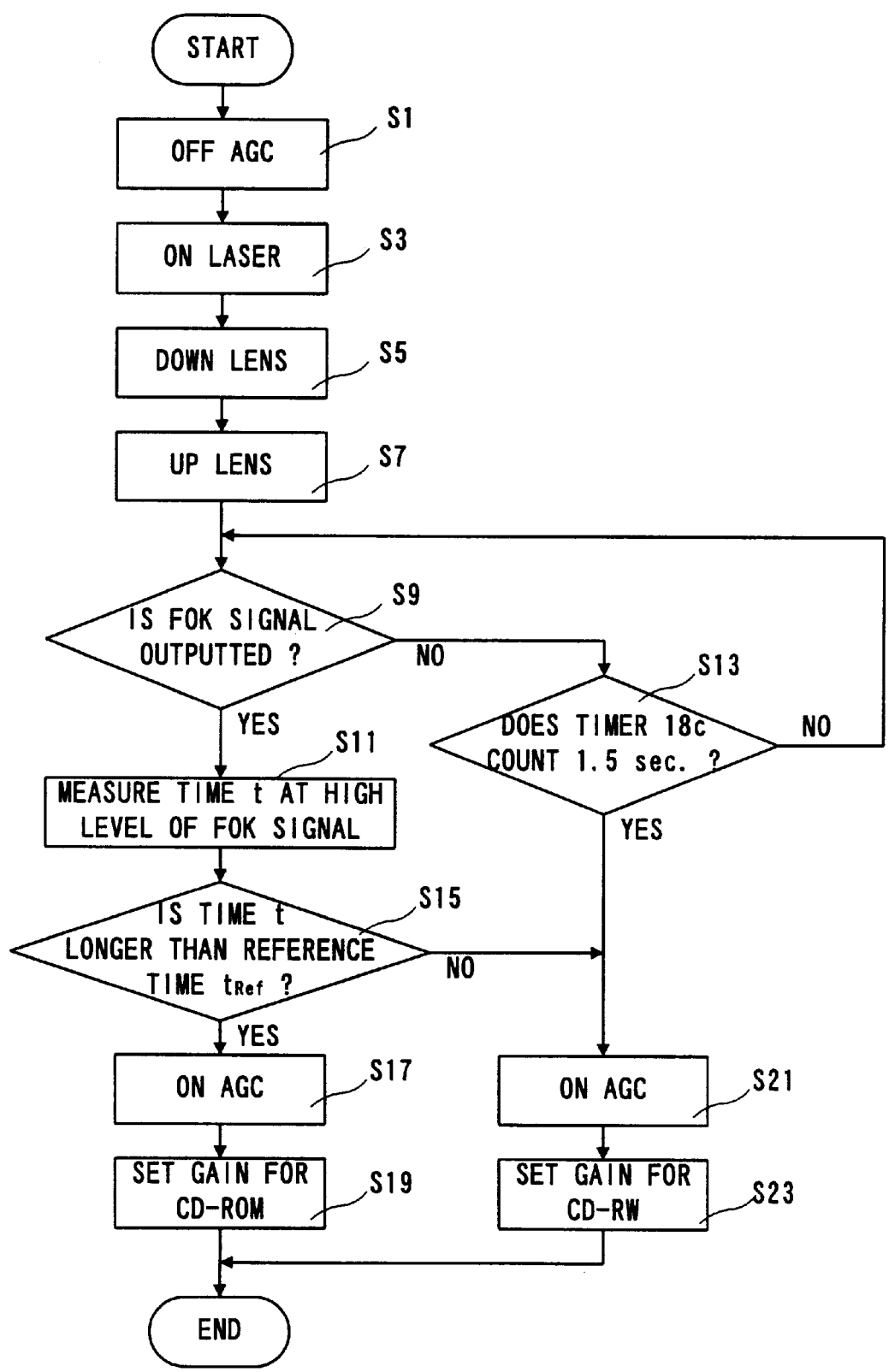
FIG. 3 is a flowchart showing part of a micro-computer process for the FIG. 1 embodiment.

That is, the micro-computer 18 starts processing when an optical disc 14 is mounted on the optical disc apparatus 10 to process a flowchart shown in FIG. 3. The AGC circuit 16a is turned off at a step S1, a laser beam is emitted through the lens 12a at a step S3, and the lens 12a is moved downward at a next step S5. When the lens 12a reaches an actuator lowest position, the lens 12a is moved upward at a step S7. At a step S9, whether an FOK signal is outputted or not is determined. If "YES" here, a high level time t in the FOK signal is measured by the timer 18b at a step S11. If "NO", it is determined at a step S13 whether the count value of the timer 18c exceeds 1.5 seconds or not. If "NO" here, the process returns to the step S9, while if "YES", the AGC circuit 16a is brought to on at a step S21 and a gain is set for CD-RW at a step S23, thus ending the process.

Also, at a step S15 it is determined whether the time t measured at the step S11 is greater than the reference time $t_{Ref}$ memorized in the memory 18a. If "NO" here, the process moves to a step S21. However, if "YES", the AGC circuit 16a is brought to on at a step S17 and a gain of the AGC circuit 16a is set for CD-ROM at a step S19, thus ending the process.

According to the present embodiment, when discriminating a disc type, the AGC circuit 16a provided in the RF amplifier is turned to off. It is therefore possible to accurately discriminate a disc type based depending on a measured high level time of an FOK signal that is obtained by slicing an RFDC signal generated upon focus search at a predetermined level and a reference time $t_{Ref}$.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An optical disc apparatus, comprising:
   an RF amplifier having an input for receiving an RF signal outputted from an optical pickup and an outputs for issuing a reproduced signal;
   discriminating means for discriminating between different types of discs depending upon a level of the reproduced signal outputted from said RF amplifier; and
   switching means for turning off the AGC circuit of said RF amplified when said discriminating means discriminates the type of said disc.

2. An optical disc apparatus according to claim 1, further comprising: an adjusting means which adjusts a gain of said AGC circuit of said RF amplifier based upon a discrimination result when the discrimination of the disc type by said discriminating means is ended.

3. An optical disc apparatus according to claim 2, wherein said discriminating means includes a counting means for counting a time period of a high level of a signal obtained by slicing the output of said RF amplifier at a predetermined level, and judging means for judging the kind of disc by determining whether or not said time period that is counted by said counting means is longer or shorter than a reference time period.

4. An optical disc apparatus according to claim 3, wherein said judging means judges that the disc is a CD-ROM when said time period is longer than said reference time period and that the disc is a CD-RW when said time period is short than said reference time period.

5. An optical disc apparatus according to claim 1, wherein said discriminating means includes a counting means for counting a time period of a high level of a signal obtained by slicing the output of said RF amplifier at a predetermined level, and judging means for judging the kind of disc by determining whether or not said time period that is counted by said counting means is longer or shorter than a reference time period.

6. An optical disc apparatus according to claim 5, wherein said judging means judges that the disc is a CD-ROM when said time period is longer than said reference time period and that the disc is a CD-RW when said time period is short than said reference time period.

* * * * *